Dec. 13, 1955  A. H. SEILLY  2,727,158
ELECTRIC ENGINE-STARTING MOTOR
Filed July 19, 1954  3 Sheets-Sheet 1

Inventor
A. H. Seilly
By Stewart Downing Leeble
Attys

United States Patent Office 2,727,158
Patented Dec. 13, 1955

2,727,158

ELECTRIC ENGINE-STARTING MOTOR

Alec Harry Seilly, London, England, assignor to C. A. V. Limited, London, England Application July 19, 1954, Serial No. 444,341

Claims priority, application Great Britain July 28, 1953

3 Claims. (Cl. 290—38)

This invention has for its object to provide in an improved form an electric engine-starting motor of the kind provided with a pinion arranged for slidable engagement with a toothed wheel on the engine.

A motor in accordance with the invention includes the combination of an axially slidable sleeve provided with an engine-engaging pinion and having a quick-pitch screw or equivalent connection with the motor armature spindle on which the sleeve is mounted, a hollow cylindrical solenoid iron core surrounding the said sleeve and adapted to impart an initial axial movement to the sleeve, a stationary annular electromagnet winding surrounding one end of the said core, and a switch movable to its closed position by the core for effecting a supply of current to the motor.

The invention further comprises a mechanism as above specified which includes also a second switch, and a catch for holding the second switch in its open position, the catch being releasable by the sleeve, and the arrangement being such that the other switch serves to control an initial restricted current supply to the motor, the full current being controlled by the second switch.

Figure 1:
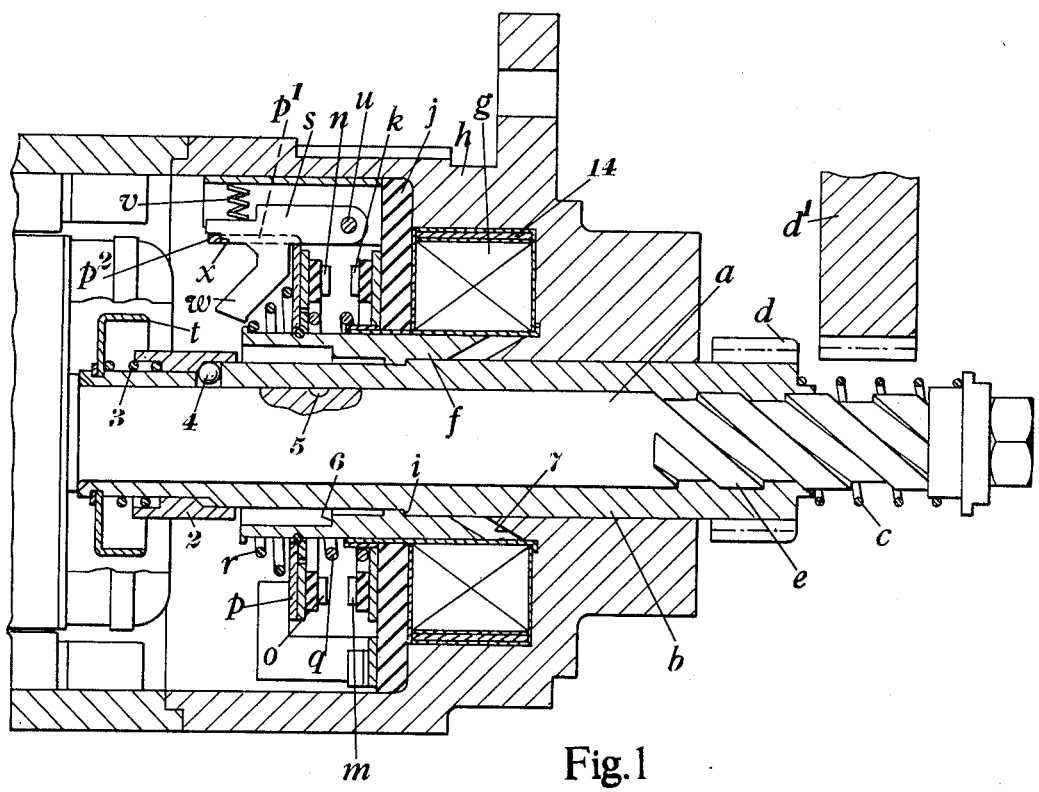
Figure 1 is a sectional elevation of an electric engine-starting motor constructed according to the invention with the movable parts in their rest positions.

Referring to the drawing, an extended end of the motor armature spindle $a$ has mounted on it an axially slidable sleeve $b$ made from non-magnetic metal and loaded by a spring $c$. On the outer end of the sleeve is formed or secured a pinion $d$ for engagement with a toothed wheel $d^1$ on the engine. The armature spindle and sleeve are interconnected by a quick-pitch screw thread $e$, or an equivalent means such as a pin on the one part engaging an oblique slot or groove in the other.

The sleeve is surrounded by an axially slidable hollow cylindrical iron part $f$ forming the core of a solenoid, the annular winding $g$ of which is mounted in one end of the motor casing $h$ adjacent to one end of the said core. To enable the sleeve and core to move together through a short axial distance, the sleeve is provided with a circumferential step $i$ which abuts against a complementary shoulder in the core.

Adjacent to one end of the solenoid winding there is provided in the casing $h$ an annular disc $j$ of electrically insulating material which carries a pair of fixed contacts $k$, $m$ forming parts of two switches. The movable contacts $n$, $o$ of both switches are carried on an annular and tiltable disc $p$ which surrounds the core and is loaded at its opposite sides by springs $q$, $r$. The disc is held in one position by a pivotal catch $s$ and for releasing the catch a collar $t$ is provided on the inner end of the sleeve.

In the example illustrated, the catch $s$ consists of a lever which is pivoted at $u$ and is loaded by a spring $v$. Also it is provided with a tail $w$ which extends through a slot $p^1$ in a lug $p^2$ extending from the periphery of the disc $p$ and has formed on it a step $x$ which can abut against one end of the slot for holding the disc in the position shown. Release of the catch is effected by contact of the part $t$ with the tail $w$ of the catch.

Also there is preferably mounted on the sleeve $b$ a slidable collar 2 which is loaded by a spring 3 and serves to move a catch ball 4 into engagement with a recess 5 in the spindle $a$ for securing the sleeve to the spindle when the pinion $d$ is moved into engagement with the toothed wheel $d^1$ on the engine, so preventing inadvertent return of the sleeve to its normal position before the engine has been fully started. The extent of movement of the collar on the sleeve is determined by a shoulder 6 in the core $f$.

Figure 1A:
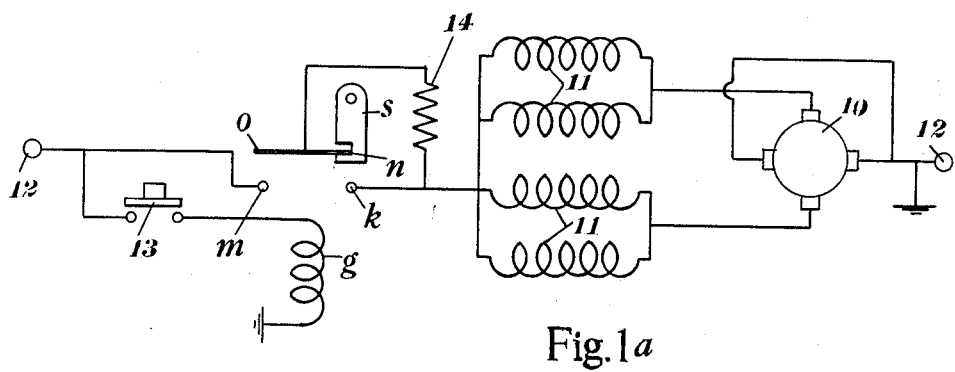
Figure 1a is a diagram illustrating the electrical connections of the motor.
Figure 2:
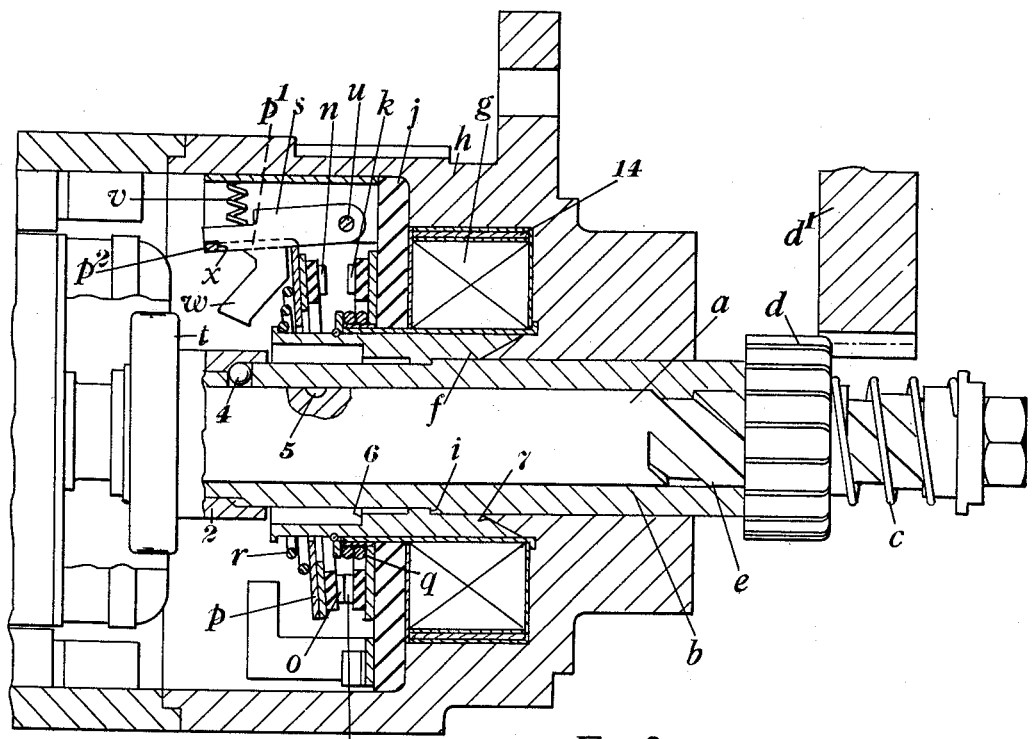
Figures 2 and 2a are respectively similar views to Figures 1 and 1a illustrating various parts in different positions.
Figure 2A:
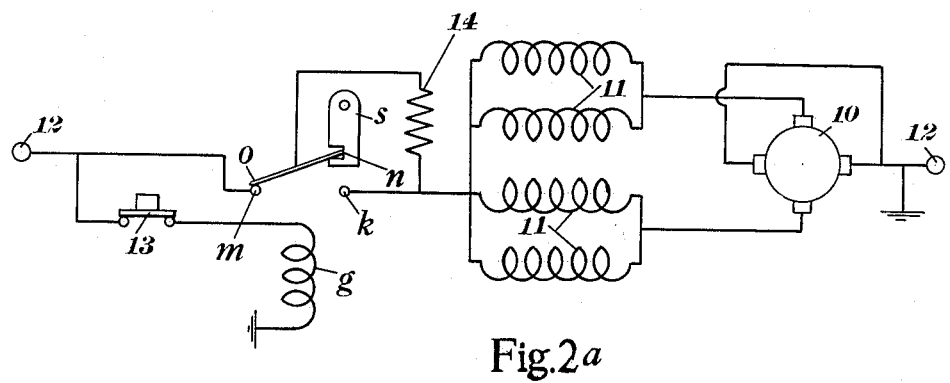
Figure 3:
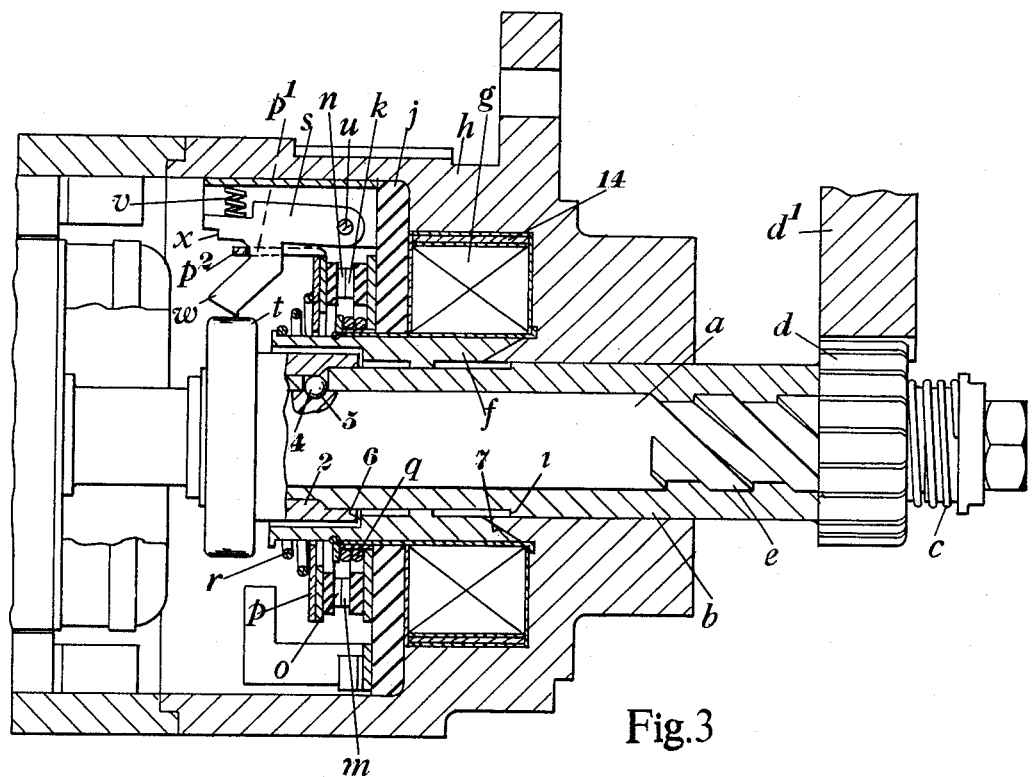
Figures 3 and 3a are respectively similar views to Figures 2 and 2a illustrating various parts in other positions.
Figure 3A:
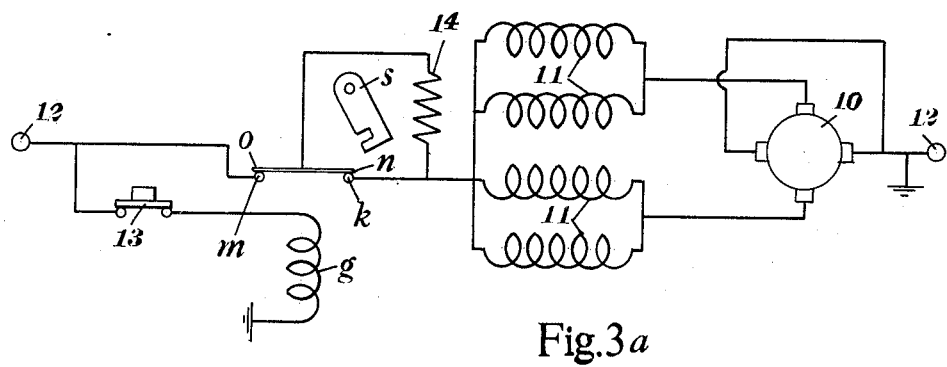

In Figures 1a, 2a and 3a, the motor armature and field windings are indicated by 10 and 11 respectively and the motor-current supply terminals are indicated by 12.

Starting with the movable parts in the positions shown in Figures 1 and 1a, the mode of action is as follows:

On closing (by a manually operable switch 13) the circuit containing the solenoid winding $g$, the core $f$ moves the sleeve $b$ axially for effecting initial engagement of the pinion $d$ with the wheel $d^1$ on the engine. The extent of this movement is determined by abutment of one end of the core with an annular shoulder 7 in the motor casing $h$. During this movement the upper part of the disc $p$ is held by the catch and consequently the core $f$ by its action on the spring $r$ causes the latter to tilt the said disc, thereby closing together the contacts $m$, $o$ (as shown in Figures 2 and 2a), so enabling current to pass from a battery or other source to the motor, the amount of this current being restricted by a resistance 14. The resulting slow rotation of the armature causes the screw or like connection between the spindle and sleeve to slide the pinion into full engagement with the wheel on the engine as shown in Figures 3 and 3a. At the same time the catch ball 4 secures the sleeve to the spindle.

Immediately prior to full engagement of the pinion with the wheel, the collar $t$ on the sleeve releases the catch and allows the spring $r$ to move the disc $p$ for closing together the other pair of contacts $k$, $n$ thereby short-circuiting the resistance 14 and enabling full current to be supplied to the motor for starting the engine. After the engine has been set in motion the solenoid switch 13 is re-opened, and the various parts are then restored to their initial positions by the screw connection between the spindle and sleeve, and by the various springs, the contacts being separated by the action of the spring $q$ on the disc $p$.

By this invention efficient starters can be provided in simple and compact form.

Having thus described my invention what I claim as new and desire to secure by Letters Patent is:

1. An electric engine-starting motor of the kind specified, having in combination an armature spindle, an axially slidable sleeve mounted on said spindle and provided with an engine-engaging pinion, means interconnecting said spindle and sleeve so that relative rotation thereof causes axial movement of said sleeve and pinion, a hollow cylindrical solenoid core surrounding said sleeve, a stationary annular electromagnet winding surrounding one end of said core and serving, when energised, to impart initial axial movement to said sleeve and pinion through said core, and motor-current control switch means movable to its closed position by said core.

2. An electric engine-starting motor of the kind specified, having in combination an armature spindle, an axially slidable sleeve mounted on said spindle and provided with an engine-engaging pinion, means interconnecting said spindle and sleeve so that relative rotation thereof causes axial movement of said sleeve and pinion, a hollow cylindrical solenoid core surrounding said sleeve, a stationary annular electromagnet winding surrounding one end of said core and serving, when energised, to impart initial axial movement to said sleeve and pinion through said core, a first motor-current control switch movable to its closed position by said core for permitting an initial restricted current supply to the motor, a second motor-current control switch movable to its closed position by said core for permitting a full current supply to the motor, and a catch for retaining said second switch in its open position, said catch being releasable by said sleeve.

3. An electric engine-starting motor of the kind specified, having in combination an armature spindle, an axially slidable sleeve mounted on said spindle and provided with an engine-engaging pinion, means interconnecting said spindle and sleeve so that relative rotation thereof causes axial movement of said sleeve and pinion, a hollow cylindrical solenoid core surrounding said sleeve, a stationary annular electromagnet winding surrounding one end of said core and serving, when energised, to impart initial axial movement to said sleeve and pinion through said core, motor-current control switch means movable to its closed position by said core, and a catch for interconnecting said spindle and sleeve to prevent inadvertent return movement of said sleeve and pinion following axial movement thereof in response to relative rotation of said spindle and sleeve.

References Cited in the file of this patent

UNITED STATES PATENTS

| | | |
|---|---|---|
| 1,331,168 | Richard | Feb. 17, 1920 |
| 1,764,906 | Steiner | June 17, 1930 |
| 2,151,463 | Callsen et al. | Mar. 21, 1939 |
| 2,178,098 | Elkin | Oct. 31, 1939 |
| 2,333,765 | Celio | Nov. 9, 1943 |
| 2,425,946 | Lee | Aug. 19, 1947 |
| 2,689,310 | Kaufmann | Sept. 14, 1954 |